United States Patent [19]

Grunner et al.

[11] 4,124,345
[45] Nov. 7, 1978

[54] APPARATUS FOR CASTING OR INJECTION-MOLDING CAR TIRES

[75] Inventors: Erich Grunner; Ewald Schaller, both of Vienna, Austria

[73] Assignee: Lim-Holding S.A., Luxembourg, Luxembourg

[21] Appl. No.: 805,466

[22] Filed: Jun. 10, 1977

[30] Foreign Application Priority Data

Jun. 11, 1976 [AT] Austria .................. 4303/76

[51] Int. Cl.² .......................... B29F 1/00; B29H 5/02; B29H 5/08
[52] U.S. Cl. .................. 425/183; 425/34 R; 425/129 R; 425/130; 425/46; 425/47; 425/39; 425/54; 425/542; 425/577; 425/589
[58] Field of Search .................. 425/129 S, 130, 182, 425/183, 28 R, 35, 542, 46, 47, 589, 577

[56] References Cited

U.S. PATENT DOCUMENTS

| 3,302,243 | 2/1967 | Ludwig | 425/130 X |
|---|---|---|---|
| 3,319,300 | 5/1967 | Hehl | 425/130 X |
| 3,730,658 | 5/1973 | Marra | 425/47 |
| 3,741,696 | 6/1973 | Greenwood | 425/47 |
| 3,833,323 | 9/1974 | Pasch | 425/47 |
| 3,837,986 | 9/1974 | Gorter et al. | 425/28 R X |
| 3,852,006 | 12/1974 | Irie | 425/47 |
| 3,924,982 | 12/1975 | Yang et al. | 425/35 |
| 3,999,907 | 12/1976 | Pappas | 425/47 X |
| 4,043,725 | 8/1977 | Schmidt | 425/34 R X |

Primary Examiner—J. Howard Flint, Jr.
Attorney, Agent, or Firm—Karl F. Ross

[57] ABSTRACT

Apparatus casting for injection-molding car tires whose internal contour is determined by a core and whose external contour is established by mold shells which are, at least partially, provided with lateral shells movable in an axial direction, thereby the various regions of the tires being cast or injected in separate operations. The mold shells, in addition to lateral shells, are provided with external segments and at least two external segments of different shape are pivotedly attached to segment holders positioned around the tire being produced so that the segment holders are radially adjustable with respect to the tire under production.

3 Claims, 3 Drawing Figures

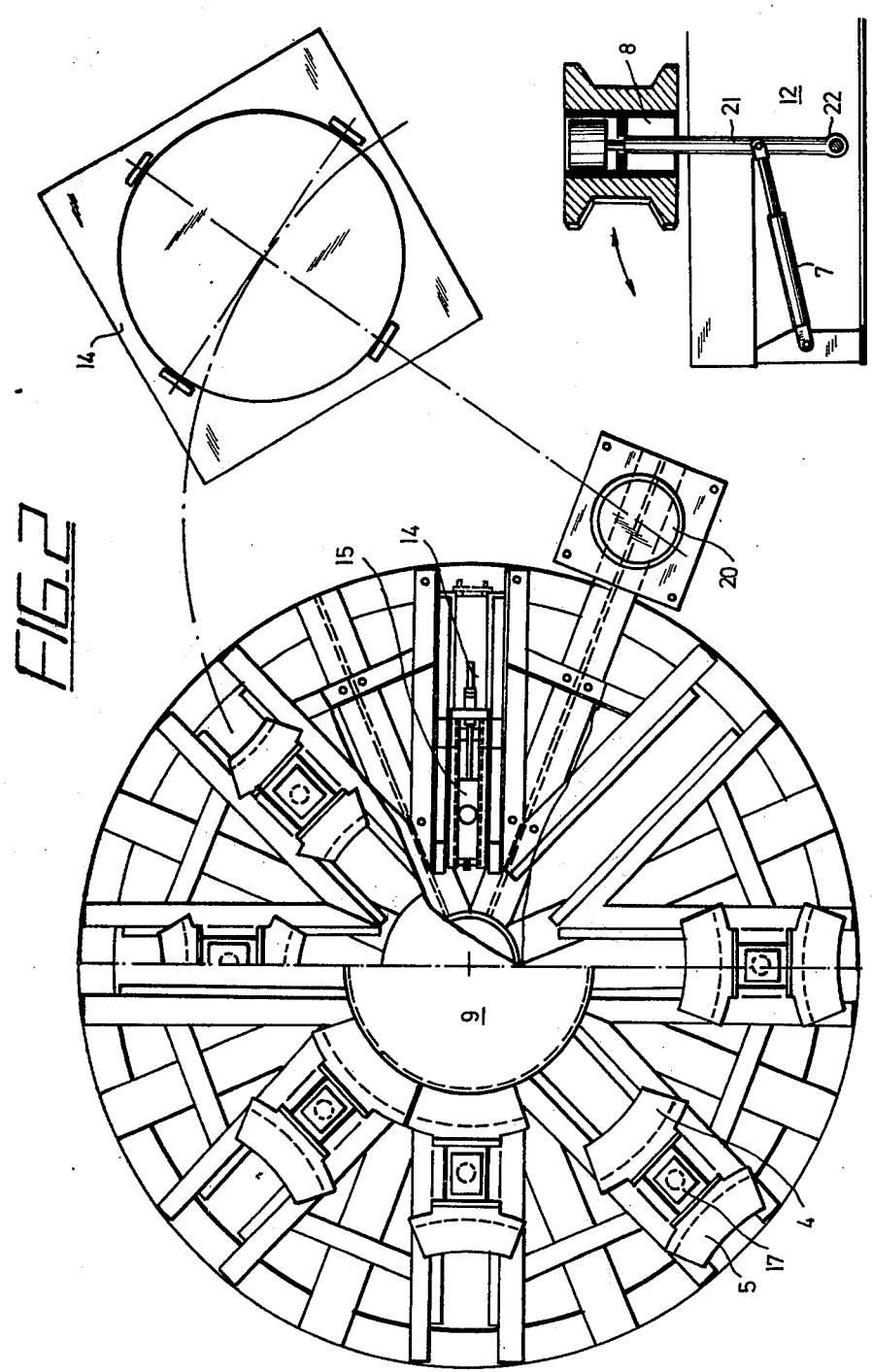

APPARATUS FOR CASTING OR INJECTION-MOLDING CAR TIRES

FIELD OF THE INVENTION

The present invention relates to apparatus for casting or injection molding (die casting) car tires whose internal contour is determined by a core and whose external contour, by mold shells which are, at least partially, provided with lateral shells movable in an axial direction, the various regions of the tires being cast or injected in separate operations by means of at least two mold shells of different shape.

BACKGROUND OF THE INVENTION

Apparatus of this kind has already been proposed; the individual sections of the tire are injected in separate stations of such apparatus. In particular, there is a station provided for the torus and another one for the tread sections. With such known apparatus transport devices were needed for effecting transfer from one station to the other. Transport devices of this type increased the construction cost, on one hand, and made the production of the tire complicated, on the other hand production was complicated by the fact that the external shells used are composed of a top and a bottom part which are movable only axially with respect to each other, and the removal of the partially cast or injected tires together with the core and the insertion of this unit into the next-following external shell was a troublesome operation.

OBJECT OF THE INVENTION

An object of the present invention is to eliminate the above drawbacks of crown tire-molding apparatus.

SUMMARY OF THE INVENTION

According to the present invention, there is provided an apparatus for casting or injecting car tires (generally molding) whose internal contour is determined by a core and whose external contour is defined by mold shells which are, at least partially, provided with lateral members movable in an axial direction, with the various regions of the tires being cast or injected in separate operations. The mold shells, in addition to lateral shells, are provided with external segments and at least two external segments of different shape are pivotedly attached to segment holders positioned around the tire being produced so that the segment holders being radially adjustable with respect to the tire under production.

The apparatus according to the invention makes it possible, first, to adjust one of the external segments radially and to cast or inject the first section of the tire around the stationary core; then the segment holder is moved outwardly and the external segments are rotated in such manner that the other external segments are turned to the tire in the same manner as in the first injection process. The segment holders are subsequently adjusted in the radial direction and the next section of the tire is cast.

For carrying out all these steps, there are required only relatively inexpensive drives and therefore the cost of the unit is be low.

In a particularly advantageous embodiment of the apparatus of the invention, the segment holders are, displaceable in radial guides, the segment holders being positioned so that they can be adjusted in a carriage movable on the guides.

It is, however, also possible for the segment holders to be mounted so as to be transversally tilted about the axis of the tire being produced or about axes outside the tire.

Drives of various types may be used for carrying out the tilting of the segments. It has been found to be particularly advantageous when cylinder-piston units, which are displaceable or tiltable, act upon the segment holders since units of this type possess a satisfactorily large mobility and their control is relatively simple.

BRIEF DESCRIPTION OF THE DRAWING

FIG. 2 shows a topview of an equipment of this type; and

FIG. 3 shows a tiltably supported segment holder.

SPECIFIC DESCRIPTION

Figure 1:
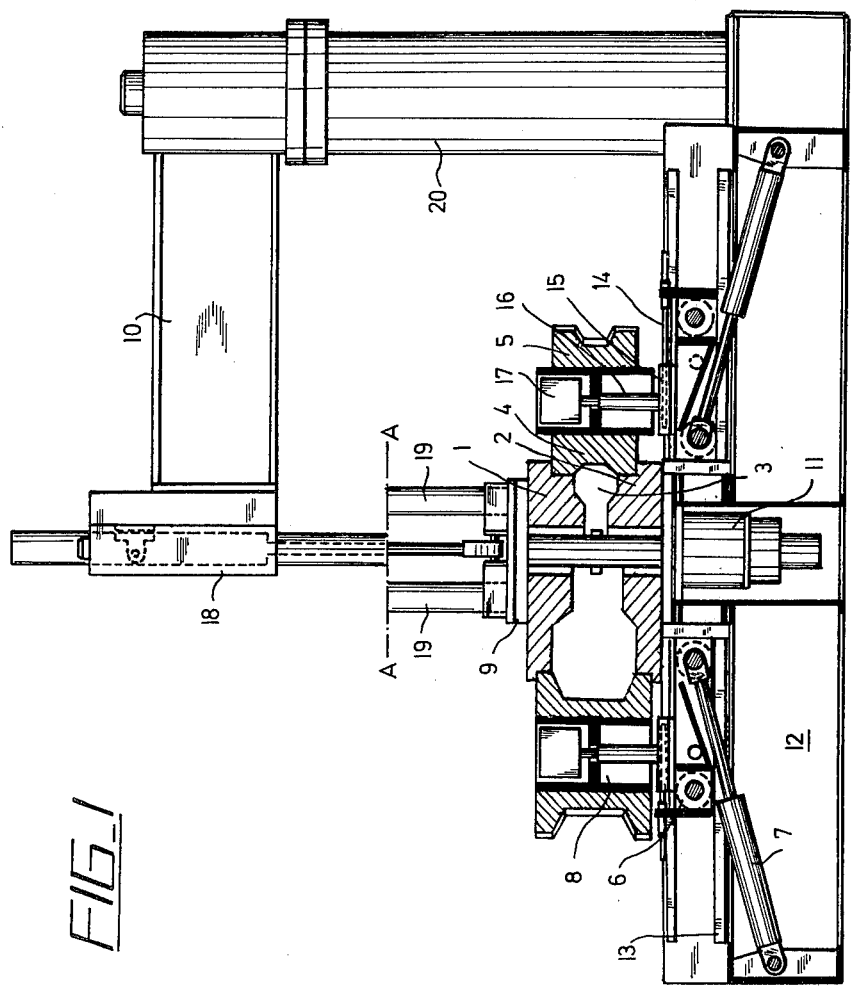
FIG. 1 illustrates, partially in cross-section, an equipment according to the invention provided with displaceable segment holders.

As shown in FIGS. 1 and 2, the mold comprises axially movable lateral shells 1 and 2 and external segments 4 or 5. It is these parts that determine the external contours of the tire being produced while the internal contour is determined by a core (not illustrated) adapted to be received in space 2.

External segments 4 and 5 are installed on segment holders 8 which are positioned on a carriage 6 around the tires being produced. Each carriage 6 is displaceable on radial guides 13 by means of cylinder-piston units 7. An axel holder 15, from which shaft 16 extends upwards, is adjustable by means of spindle 14 on each carriage 6. External segments 4 or 5 can be rotated about shaft 16 parallel to the axis of the tire, by means of the rotary motion drive 17.

The lateral shell 1 forming the lateral section of the tire being produced is positioned on the top while lateral shell 2, is placed on the bottom. Lateral shell 1 is fixed on support 9 which may be raised or lowered by means of hydraulic motor 18. Guidance is provided by columns, drawn only up to sectional plane A—A. Hydraulic motor 18 together with support 9 is fixed on a boom 10 of column jib crane 20.

Lateral bottom shell 2 is acted upon by spanning unit 11 by means of which both shells 1 and 2 can be fixed with respect to each other. This makes it possible to counteract the forces developing during the injection.

The entire apparatus is mounted on frame 12, thereby obtaining a compact unit. Besides the apparatus described, operation stand 14 is provided onto which the tire already cast may be placed together with its core. Taking the core out of the mold and its subsequent dismounting can be carried out on this stand.

The procedure of the tire production is as follows:

From operation stand 14', the core is placed into the mold by means of column jib crane 20 and shell support 9. By means of drive 17, the external segments are rotated in such a manner that the body carcass-forming segments are inwardly turned. Carriages 6 on guides 13 are radially displaced inward by means of cylinder-piston units 7 so that body segments 4 are in the position illustrated in FIG. 1. By means of spanning unit 11, both shells 1 and 2 are fixed with respect to one another, and the material forming the body and lateral wall of the tire is introduced through a non-illustrated, aperture in the known manner.

With finished first casting or injecting process, body segments 4 are radially displaced outward and rotated through 180° by means of drive 17 so that profil segments 5 are turned inward. With completed radial adjustment of segments 5, the tread section of the tire will be cast or injected, thereby using another quality of material than that applied to the body of the tire. Segment holders 8 of carriages 66 are displaced outward again and spanning unit 11 loosened. By means of crane 20, the completed tire, together with the core, can be placed on operation stand 14 and the core taken off the tire.

In FIG. 1, external segments 4, 5 and lateral shells 1, 2 of different size are illustrated in order to show that the equipment may be used for tires of different sizes by merely exchanging the shells and the external segments. In another embodiment, in order not to be forced to modify the control of the piston-cylinder units 7, segment holders 8 can be adjusted to a position corresponding to those of segments 4, 5 by means of spindles 14.

FIG. 3 illustrates a segment holder 8 fixed on a lever 21. The lever may be tilted about axis 22 on frame 12 by cylinder-piston unit 7. In the case of this embodiment, therefore, the radial adjustment of the external segments is carried out by tilting about axis 22.

Within the framework of the invention, there are a multitude of variations possible to provide for, e.g., it is possible a combined displacement and rotation of the segment holder.

The embodiments of the invention in which an exclusive property or privilege is claimed are defined as follows:

1. A tire-molding apparatus comprising:
   a support;
   a pair of side wall shells spaced apart in axial direction and axially displaceable along a shell axis to define opposite outer side walls of a tire, said side wall shells being adapted to receive a tire-forming core between them;
   a plurality of segment holders angularly spaced about said shell axis and rotatable about respective segment hold axes generally parallel to the tire axis;
   a first shell segment and a second shell segment disposed in angularly spaced relation about the axis of each segment holder, said first shell segment defining the outer surface of the carcass of the tire and said second shell segment defining the outer contours of the tread of the tire;
   means for rotating the shell segments of each holder about the respective segment holder axis thereof to successively turn the shell segments of each holder toward the axis of the tire; and
   means for radially displacing each of said holders to draw one of the shell segments thereof away from a tire and enable rotation of another shell segment of the respective holder into a position in which it is turned toward the axis of said tire.

2. The apparatus defined in claim 1 wherein said support comprises a frame provided with a plurality of angularly equispaced radially extending guides centered on the axis of said tire, said means for radially displacing said holders each including a respective carriage displaceable on a respective guide toward and away from said axis of said tire, each of said holders including a shaft projecting from the respective carriage, a carrier for said first and second shell segments in diametrically opposite relation, and a motor for rotating the respective carrier through 180°, each of said carriers being connected to a piston-and-cylinder unit for displacing same.

3. The apparatus defined in claim 1 wherein each of said holders is a tiltable shaft, the means for radially displacing said holders including piston-and-cylinder units connected to each shaft for tilting same.

* * * * *